(12) United States Patent
Kuroiwa

(10) Patent No.: US 8,622,709 B2
(45) Date of Patent: Jan. 7, 2014

(54) WIND TURBINE BLADE AND WIND POWER GENERATOR USING THE SAME

(75) Inventor: Takao Kuroiwa, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 434 days.

(21) Appl. No.: 12/995,653

(22) PCT Filed: Jun. 5, 2008

(86) PCT No.: PCT/JP2008/060383
§ 371 (c)(1),
(2), (4) Date: Dec. 1, 2010

(87) PCT Pub. No.: WO2009/147740
PCT Pub. Date: Dec. 10, 2009

(65) Prior Publication Data
US 2011/0084496 A1 Apr. 14, 2011

(51) Int. Cl.
*F03D 9/00* (2006.01)
(52) U.S. Cl.
USPC .................. 416/226; 416/229 A; 416/230
(58) Field of Classification Search
USPC .............. 416/226, 229 R, 230, 229 A, 223 R; 29/889.71, 527.2; 428/98, 113
See application file for complete search history.

(56) References Cited

U.S. PATENT DOCUMENTS

| 4,339,230 A * | 7/1982 | Hill ................................ 416/226 |
| 2006/0257612 A1 * | 11/2006 | Rakutt et al. ..................... 428/54 |
| 2009/0169392 A1 | 7/2009 | Kuroiwa et al. |

FOREIGN PATENT DOCUMENTS

| JP | 8200202 A | 8/1996 |
| JP | 2001165033 A | 6/2001 |
| JP | 3825346 B2 | 9/2006 |
| JP | 2007255366 A | 10/2007 |

OTHER PUBLICATIONS

English translation of JP 2007255366 (A) Kuroiwa Takao, Hirano Toshiyuki, Nakamura Naoyasu—Windmil Wings Oct. 4, 2007.*
International Search Report for PCT/JP2008/060383 mailed Jul. 8, 2008.
A Decision to Grant, dated May 29, 2012 issued in KR Application No. 10-2010-7011390.
A Decision to Grant, dated Jul. 10, 2012, issued in CN Application No. 200880118028.8.
Decision to Grant for JP 2010-515716 mailed Oct. 23, 2012.
Decision to Grant in corresponding Mexican Patent Application No. MX/a/2010/013088, which issued on Dec. 13, 2012.
Decision to Grant in corresponding Australian Patent Application No. 2008357369, which issued on Dec. 7, 2012.

* cited by examiner

*Primary Examiner* — Edward Look
*Assistant Examiner* — Maxime Adjagbe
(74) *Attorney, Agent, or Firm* — Kanesaka Berner & Partners, LLP

(57) ABSTRACT

A wind turbine blade using a core member that is light and low-cost while maintaining strength and a wind power generator using the same are provided. A wind turbine blade (9) is formed of a fiber-reinforced plastic skin (13). The skin (13) or a main beam (15) uses a core member (39) formed integrally of fiber layers (55) arranged so as to intersect in plan view and each penetrate in the thickness direction to constitute flow paths for resin and plastic foam members (57) filling spaces between the fiber layers (55), in such a manner that the fiber layers (55) are impregnated with the resin.

20 Claims, 5 Drawing Sheets

WIND TURBINE BLADE AND WIND POWER GENERATOR USING THE SAME

RELATED APPLICATIONS

The present application is a national phase of PCT/JP2008/060383, filed Jun. 5, 2008, the disclosure of which is hereby incorporated by reference herein in its entirety.

1. Technical Field

The present invention relates to wind turbine blades and a wind power generator using the same to generate power.

2. Background Art

Wind turbine blades used in a wind power generator are required to be light, strong, and easy to fabricate. These needs are met by using a composite structure, as shown, for example, in Patent Citation 1.

This consists of two members, namely, a glass-fiber-reinforced plastic skin that defines the blade shape and a glass-fiber-reinforced plastic main beam that is disposed in the skin. By assembling and bonding them, a predetermined overall structure is obtained.

As shown in FIGS. 2 and 3, considering the buckling strength, a sandwich-structured portion formed of fiber-reinforced plastic and solid foam (a core member) sandwiched therebetween is used in the skin or the main beam.

Conventionally, polyvinyl chloride foam having high mechanical strength (for example, trade name: Kiegecell (registered trademark), manufactured by Kanegafuchi Chemical Industry Co., Ltd.) is used as solid foam serving as the core member.

Instead of solid foam, balsa is sometimes used as the core member.

Patent Citation 1: the Publication of Japanese Patent No. 3825346 (FIG. 5)

Meanwhile, polyvinyl chloride foam needs to be relatively dense to exhibit sufficient strength. However, this makes the foam heavy and increases cost, significantly affecting the performance and manufacturing cost of wind turbines.

Furthermore, balsa is wood and the supply thereof is limited. Therefore, it is not suitable for stable mass production, and thus, the price may increase.

The present invention has been made in view of the above-described circumstances, and an object thereof is to provide wind turbine blades using a core member that is light and low-cost while maintaining strength and to provide a wind power generator using such wind turbine blades.

In order to solve the above-described problems, the present invention employs the following solutions.

A first aspect of the present invention provides a wind turbine blade formed of a fiber-reinforced plastic skin. A sandwich-structured portion of the skin uses a core member formed integrally of fiber layers that are arranged so as to intersect in plan view and that each penetrate in the thickness direction to constitute flow paths for resin and plastic foam filling spaces between the fiber layers, in such a manner that the fiber layers are impregnated with the resin.

In the wind turbine blade according to this aspect, the core member is used in the sandwich-structured portion of the skin in such a manner that the fiber layers are impregnated with the resin. Thus, the fiber layers constitute fiber-reinforced resin layers.

The fiber layers are arranged so as to intersect in plan view and each penetrate in the thickness direction. Thus, sufficient strength of the core member can be ensured.

Therefore, because it becomes unnecessary to require the plastic foam filling the spaces between the fiber layers to have high strength, it is possible to use light (low-density), low-cost plastic foam. Thus, the cost of the wind turbine blades can be reduced.

Note that examples of such plastic foam include low-density foam composed of polyurethane and polyisocyanate.

Furthermore, the resin impregnated into the fiber layers functions to be bonded to the fiber layers on the front and back surfaces of the sandwich structure. Thus, the sandwich structure is more strongly integrated, whereby the durability can be increased.

In the above-described aspect, it is preferable that the sandwich-structured portion be provided in a main beam disposed between the skin disposed so as to oppose each other.

By doing so, buckling of the main beam can be prevented while reducing an increase in cost.

In the above-described aspect, it is preferable that the sandwich-structured portion be provided on the skin.

By doing so, buckling of the skin can be prevented while reducing an increase in cost.

In the above-described aspect, it is preferable that the core member be formed in the shape of a portion where it is used.

By doing so, the core member can be tightly fitted into a predetermined installation position.

In the above-described aspect, it is preferable that the core member is configured to include a plurality of units and to be assembled from these units into the shape of a portion where it is used.

By doing so, it is easy to cope with an increase in size of the core member by assembling these units.

In the above-described configuration, it is preferable that the units be rectangular-parallelepiped-shaped and use correcting units for correcting the shape such that the units are formed in the shape of a portion where they are used.

By doing so, the units have only a rectangular-parallelepiped shape. Thus, the units can be produced easily and at low cost.

Note that, because the correcting units are used only in some parts, they may either have the same structure as the units or be formed of conventional solid foam or balsa.

A second aspect of the present invention provides a wind power generator that uses a wind turbine blade employing a light (low-density), low-cost core member capable of ensuring sufficient strength.

By doing so, the wind power generator can have sufficient strength with a minimum increase in cost.

According to the present invention, the fiber layers penetrating in the thickness direction of the core member constitute the fiber-reinforced resin layers and can ensure sufficient strength of the core member.

Therefore, because it becomes unnecessary to require the plastic foam to have high strength, it is possible to use light (low-density), low-cost plastic foam. Thus, the cost of the wind turbine blades can be reduced.

Furthermore, the resin impregnated into the fiber layers functions to be bonded to the fiber layers on the front and back surfaces of the sandwich structure. Thus, the sandwich structure is more strongly integrated, whereby the durability can be increased.

EXPLANATION OF REFERENCE

Figure 1:
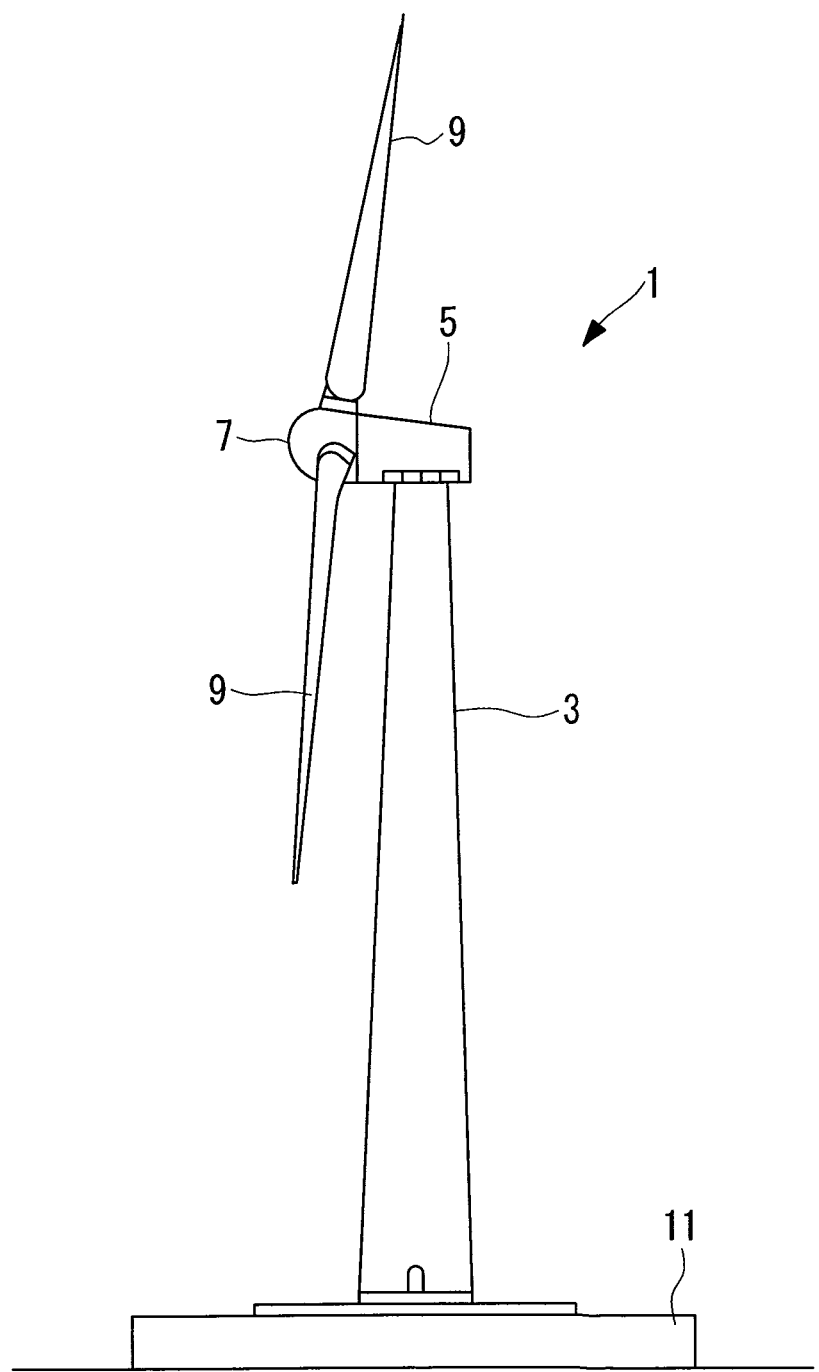
FIG. 1 is a side view showing, in outline, the overall structure of a wind power generator according to an embodiment of the present invention.

1: wind power generator
9: wind turbine blade
13: skin
15: main beam
17: main beam
19: middle sandwich-structured portion
25: leading-edge-side sandwich-structured portion
27: trailing-edge-side sandwich-structured portion
29: core member
31: core member
33: core member
35: core unit
37: correcting core unit
39: core member
49: core member
55: fiber layer
57: plastic foam member

BEST MODE FOR CARRYING OUT THE INVENTION

A wind power generator 1 according to an embodiment of the present invention will be described below based on the drawings.

FIG. 1 is a side view showing, in outline, the overall structure of the wind power generator 1.

As shown in FIG. 1, the wind power generator 1 includes a tower 3 installed upright on a foundation 11, a nacelle 5 disposed on the top of the tower 3, a rotor head 7 provided on the nacelle 5 so as to be rotatable about a substantially horizontal shaft, and a plurality of wind turbine blades 9 radially attached to the rotation shaft of the rotor head 7.

The force of wind blowing against the wind turbine blades 9 in the direction of the rotation shaft of the rotor head 7 is converted into motive power that rotates the rotor head 7 about the rotation shaft.

Although not shown in the figure, an anemometer for measuring the ambient wind speed, an anemoscope for measuring the wind direction, and a lightning rod are provided at appropriate locations (for example, the upper part) on the outer circumferential surface of the nacelle 5.

Although not shown in the figure, a generator connected to the rotor head 7 through a coaxial gearbox is disposed in the nacelle 5. That is, by accelerating the rotation of the rotor head 7 with the gearbox to drive the generator, generator output power can be obtained from the generator.

Figure 2:
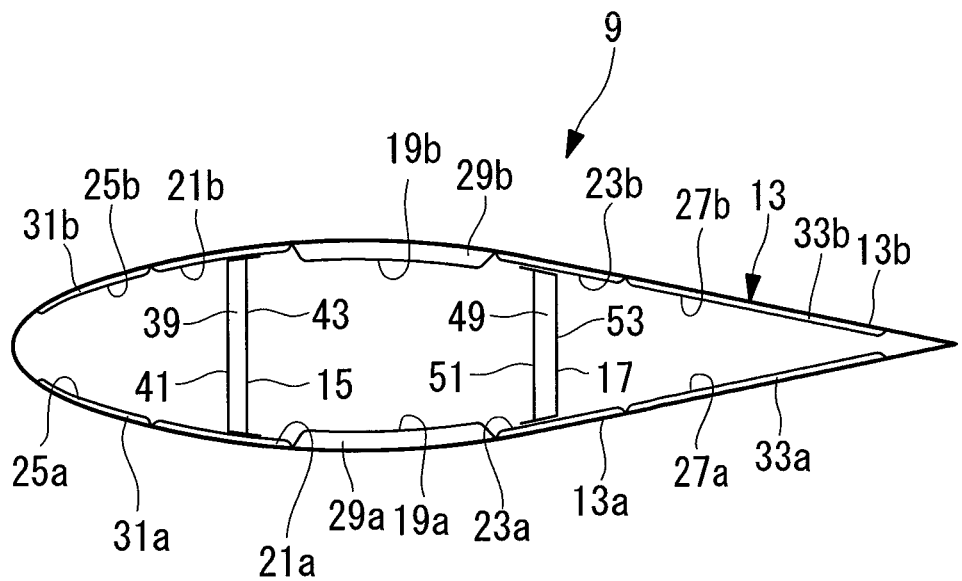
FIG. 2 is a lateral cross-sectional view showing an example of a lateral cross-section of a wind turbine blade according to an embodiment of the present invention.
Figure 3:
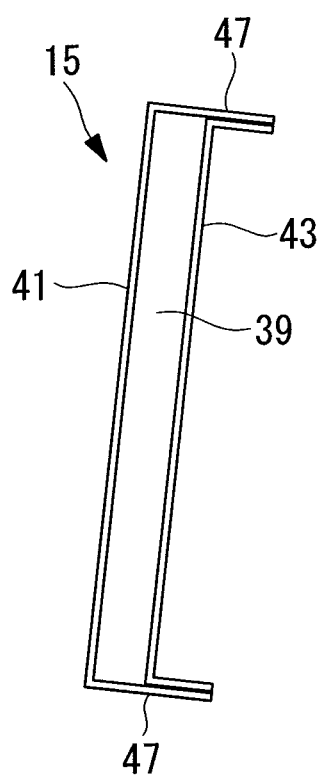
FIG. 3 is a sectional view showing an example of a cross-section of a main beam according to an embodiment of the present invention.

FIG. 2 is a lateral cross-sectional view of the wind turbine blade 9. The wind turbine blade 9 includes a skin 13 that defines the blade shape and main beams (sandwich-structured portions) 15 and 17 that reinforce the strength of the skin 13.

The skin 13 is composed of two halved segments, namely, a ventral-side skin 13a and a dorsal-side skin 13b. The skin 13 is formed of glass-fiber-reinforced plastic (fiber-reinforced plastic).

The ventral-side skin 13a and the dorsal-side skin 13b respectively have, on the inner surfaces thereof, middle sandwich-structured portions (sandwich-structured portions) 19a2 and 19b extending in the lengthwise direction of the wind turbine blade 9, leading-edge-side girders (thick fiber portions) 21a and 21b positioned on the leading-edge side of the middle sandwich-structured portions 19a and 19b, trailing-edge-side girders (thick fiber portions) 23a and 23b positioned on the trailing-edge side of the middle sandwich-structured portions 19a and 19b, leading-edge-side sandwich-structured portions (sandwich-structured portions) 25a and 25b positioned on the leading-edge side of the leading-edge-side girders 21a and 21b, and trailing-edge-side sandwich-structured portions (sandwich-structured portions) 27a and 27b positioned on the trailing-edge side of the trailing-edge-side girders 23a and 23b.

Core members 29a and 29b are sandwiched inside the middle sandwich-structured portions 19a and 19b. Core members 31a and 31b are sandwiched inside the leading-edge-side sandwich-structured portions 25a and 25b. Core members 33a and 33b are sandwiched inside the trailing-edge-side sandwich-structured portions 27a and 27b.

Figure 4:
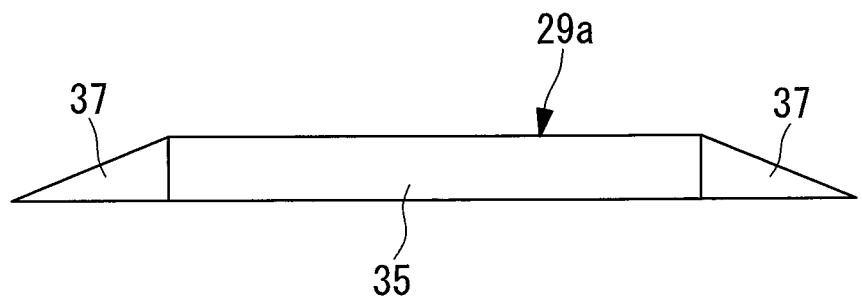
FIG. 4 is a widthwise sectional view of a core member according to an embodiment of the present invention.

For example, because the middle sandwich-structured portion 19a is formed so as to gradually decrease in height at both ends in the widthwise direction of the wind turbine blade 9 toward the ends, the core member 29a is also formed so as to gradually decrease in height at both ends in the widthwise direction toward the ends, as shown in FIG. 4.

In this case, the portion whose height is unchanged may be formed of rectangular-parallelepiped-shaped core units (units) 35, and the portions whose height gradually decreases may be formed of triangular-rod-shaped correcting core units (correcting units) 37. Because the correcting core units 37 are used only in some parts, they may be formed of conventional solid foam or balsa. This is because, as will be described below, the core units 35 have fiber layers lying in the thickness direction (height direction) and thus it is difficult to cut the core units 35 smoothly. In addition, decreasing the number of the fiber layers may prevent the effect thereof from being fully exerted.

Figure 5:
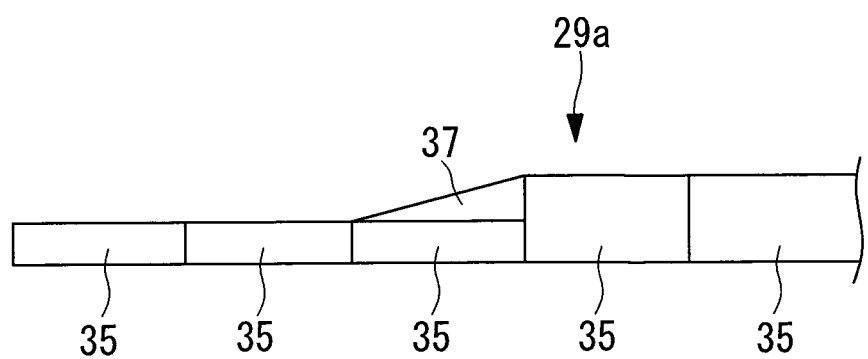
FIG. 5 is a lengthwise sectional view of the core member according to an embodiment of the present invention.

For example, because the middle sandwich-structured portion 19a is formed such that the height thereof changes in the lengthwise direction of the wind turbine blade 9, the core member 29a is also formed such that the height thereof changes in the lengthwise direction, as shown in FIG. 5. In this case too, the portions whose height changes may be formed of the triangular-rod-shaped correcting core units 37. The other portions are formed of the rectangular-parallelepiped-shaped core units 35.

In this manner, the core member 29a is formed by assembling the core units 35 into a predetermined shape. Thus, it is easy to cope with an increase in size of the core member 29a.

The main beam 15 is disposed so as to extend in the lengthwise direction of the wind turbine blade 9, from the base end to near the distal end, such that a surface portion extends between the leading-edge-side girder 21a and the leading-edge-side girder 21b.

The main beam 15 includes a core member 39 having a substantially rectangular cross-section, a leading-edge-side structural member 41 covering the leading-edge side of the core member 39, and a trailing-edge-side structural member 43 covering the trailing-edge side of the core member 39.

The leading-edge-side structural member 41 and the trailing-edge-side structural member 43 are configured to be bent toward the trailing edge at the ends at the leading-edge-side girder 21a and the leading-edge-side girder 21b and to be bonded to each other.

Bent portions 47 of the leading-edge-side structural member 41 are positioned on the outside and are strongly bonded to the leading-edge-side girders 21a and 21b with an adhesive.

The leading-edge-side structural member 41 and the trailing-edge-side structural member 43 are formed of glass-fiber-reinforced plastic.

The main beam 17 is disposed so as to extend in the lengthwise direction of the wind turbine blade 9, from the base end to near the distal end, such that a surface portion extends between the trailing-edge-side girder 23a and the trailing-edge-side girder 23b.

The main beam 17 includes a core member 49 having a substantially rectangular cross-section, a leading-edge-side structural member 51 covering the leading-edge side of the core member 49, and a trailing-edge-side structural member 53 covering the trailing-edge side of the core member 49.

The leading-edge-side structural member 51 and the trailing-edge-side structural member 53 are configured to be bent toward the leading edge at the ends at the trailing-edge-side girder 23a and the trailing-edge-side girder 23b and to be bonded to each other.

Bent portions of the trailing-edge-side structural member 53 are positioned on the outside and are strongly bonded to the trailing-edge-side girder 23a and the trailing-edge-side girder 23b with an adhesive.

The leading-edge-side structural member 51 and the trailing-edge-side structural member 53 are formed of glass-fiber-reinforced plastic.

Similarly to the core member 29a, the core members 39 and 49 are formed by assembling the core units 35.

Note that the correcting core units 37 of various shapes may be used as necessary.

Figure 6:
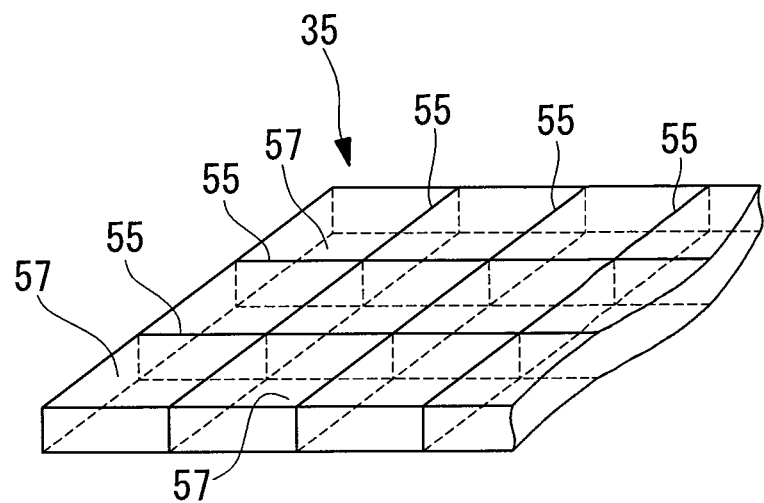
FIG. 6 is a partially cutaway perspective view showing a core unit according to an embodiment of the present invention.

Next, the structure of the core unit 35 will be described based on FIG. 6.

The core unit 35 is substantially rectangular-parallelepiped-shaped. The core unit 35 includes fiber layers 55 and plastic foam members (plastic foam) 57.

The fiber layers 55 are a textile such as glass fiber fabric and can be impregnated with resin, e.g., epoxy resin, in the in-plane direction.

Note that the fiber layers 55 need not be textile, but a mat-like member, roving, or textile using roving.

Furthermore, instead of glass fiber, any suitable fiber used for reinforcement, such as carbon fiber or aramid fiber, may be used.

The plurality of fiber layers 55 are arranged in a grid-like pattern so as to intersect in the longitudinal direction (for example, the lengthwise direction of the wind turbine blades 9) and the lateral direction (for example, the widthwise direction of the wind turbine blades 9).

The fiber layers 55 each penetrate in the thickness direction of the core unit 35.

The plastic foam members 57 are, for example, low-density foam using polyisocyanate. They may alternatively be low-density foam using polyurethane.

The plastic foam members 57 are rectangular-parallelepiped-shaped and are formed in a size capable of being fitted into the spaces formed by the fiber layers 55.

The plastic foam members 57 and the fiber layers 55 are bonded together with an adhesive.

Figure 7:
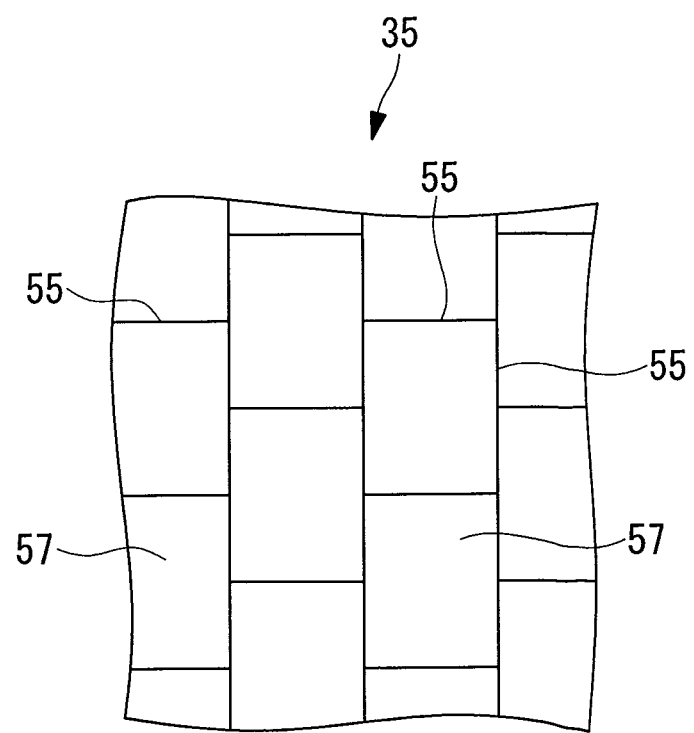
FIG. 7 is a partially cutaway plan view showing another embodiment of the core unit according to an embodiment of the present invention.

The arrangement of the fiber layers 55 is not limited to a grid-like pattern, but may be such that, for example, as shown in FIG. 7, the fiber layers 55 lying in one direction are staggered with respect to each other in adjacent rows.

Furthermore, the fiber layers 55 need not be formed so as to penetrate through the entire width, but may be formed, for example, in a size sufficient to cover the side surfaces of the plastic foam members 57 to bond them to one another. In any case, they should be configured such that the plastic foam members 57 are bonded to one another with the fiber layers 55 therebetween.

A molding apparatus 59 that forms the main beams 15 and 17 and the skin 13 includes a lower mold 61, an upper cover 63, a suction tube 67 attached to the upper cover 63 so as to penetrate therethrough and connected to a vacuum pump (not shown), and a resin supply tube 65 that supplies resin. The space between the lower mold 61 and the upper cover 63 is sealed when the lower mold 61 and the upper cover 63 are closed.

Next, a method for producing the wind turbine blade 9 will be described with reference to FIGS. 2, 4, 5, 6, 8, and 9.

First, a necessary number of rectangular-parallelepiped-shaped plastic foam members 57 of predetermined size are produced. This is done by foaming polyisocyanate using a mold of predetermined size.

Next, the fiber layers 55 of predetermined size are prepared, disposed between adjacent plastic foam members 57, and bonded to the plastic foam members 57. Thus, the fiber layers 55 are integrated with the plastic foam members 57 to form the core unit 35. Thus, the core unit 35 is formed such that the fiber layers 55 intersect in the longitudinal and lateral directions and penetrate in the thickness direction.

At this time, the fiber layers 55 are preferably disposed around the core unit 35.

Furthermore, the correcting core units 37 are produced as necessary.

These core units 35 and the correcting core units 37 are assembled together to form the core members 29, 31, 33, 39, and 49.

This is done according to the preparation conditions of the molding apparatus 59. Alternatively, this may be done when the core unit is disposed on the molding apparatus 59.

Figure 8:
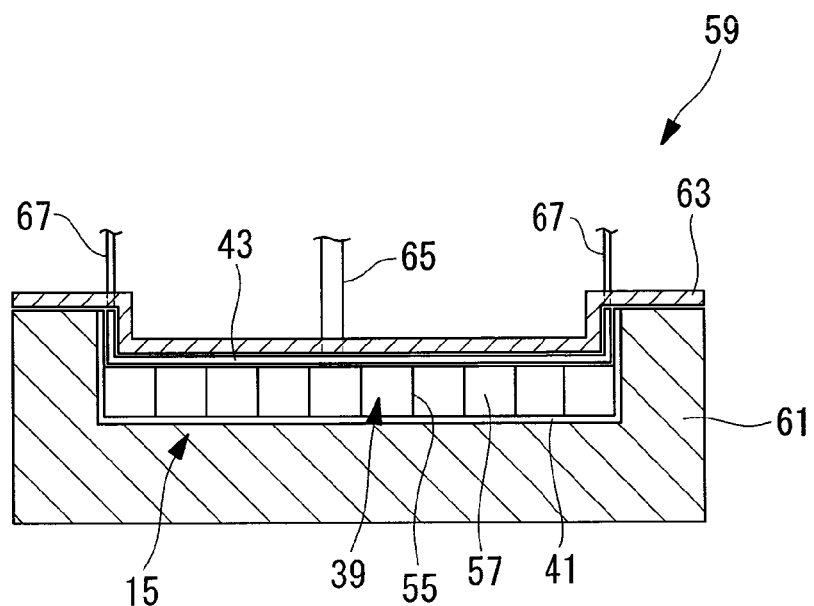
FIG. 8 is a sectional view showing a molding apparatus according to an embodiment of the present invention, while it forms the main beam.

FIG. 8 is a sectional view showing the molding apparatus 59 while it forms the main beam 15. Glass fibers are stacked on the lower mold 61, following its shape. The amount stacked is until the leading-edge-side structural member 41 has a required thickness.

The core member 39 is disposed thereon, at a predetermined position. Then, glass fibers are stacked thereon until the trailing-edge-side structural member 43 has a required thickness.

Once the above is done, the upper cover 63 is moved toward the lower mold 61, and they are closed.

In this state, the vacuum pump is activated to evacuate air from the mold. In this state, for example, liquid epoxy resin is supplied through the resin supply tube 67. The epoxy resin is impregnated into the glass fibers in the leading-edge-side structural member 41 and the trailing-edge-side structural member 43, as well as the fiber layers 55 in the core member 39.

Then, the epoxy resin is heated by heating means (not shown) for curing.

Thus, the leading-edge-side structural member 41, the trailing-edge-side structural member 43, and the core member 39 are strongly integrated by the epoxy resin. The main beam 17 is formed in the same manner.

Figure 9:
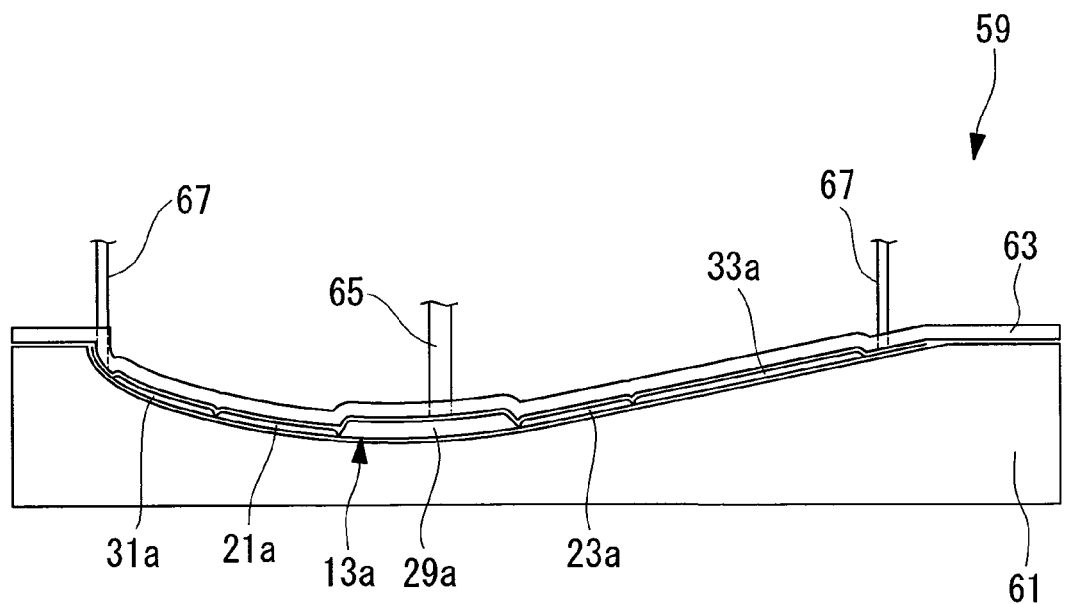
FIG. 9 is a sectional view showing the molding apparatus according to an embodiment of the present invention, while it forms a ventral-side skin.

FIG. 9 is a sectional view showing the molding apparatus 59 while it forms the ventral-side skin 13*a*. Glass fibers are stacked on the lower mold 61, following its shape, until the outside portion of the ventral-side skin 13*a* has a required thickness.

The core members 29*a*, 31*a*, and 33*a* are disposed thereon at predetermined positions. Glass fibers are stacked thereon until the inside portion of the ventral-side skin 13*a* has a required thickness.

Then, they are integrally formed in the same manner as the above-described main beam 15.

Furthermore, the dorsal-side skin 13*b* is formed in the same manner.

The dorsal-side skin 13*b* is disposed with the inside facing up. One end of the main beam 15 is bonded to a predetermined position of the leading-edge-side girder 21*b*, and one end of the main beam 17 is bonded to a predetermined position of the trailing-edge-side girder 23*b*.

Then, the ventral-side skin 13*a* is disposed with the inside facing down. The other end of the main beam 15 is bonded to a predetermined position of the leading-edge-side girder 21*a*, and the other end of the main beam 17 is bonded to a predetermined position of the trailing-edge-side girder 23*a*.

Then, the leading edge portions and the trailing edge portions of the ventral-side skin 13*a* and the dorsal-side skin 13*b* are bonded.

In this manner, the fiber layers 55 of the core members 29, 31, 33, 39, and 49 are impregnated with resin, e.g., epoxy resin. Thus, the fiber layers 55 constitute fiber-reinforced resin layers.

Because the fiber layers 55 are arranged so as to intersect in the longitudinal and lateral directions in plan view and each penetrate in the thickness direction, sufficient strength of the core members 29, 31, 33, 39, and 49 can be ensured.

Therefore, because it becomes unnecessary to require the plastic foam 57 filling the spaces between the fiber layers 55 to have high strength, it is possible to form light, low-cost, and low-density foam; for example, it is possible to use polyisocyanate. Thus, the cost of the wind turbine blades 9 can be reduced.

Because the epoxy resin impregnated into the fiber layers 55 functions to bond the core members 29, 31, 33, 39, and 49 to the fiber layers on the front and back surfaces of the sandwich structure covering the core members, the core members 29, 31, 33, 39, and 49 are integrated therewith. Thus, the durability can be increased.

Furthermore, because the resin impregnated therein is the same epoxy resin, they are more strongly bonded. Thus, the durability can be further increased.

Although the core members 29, 31, 33, 39, and 49 are used in the main beams 15 and 17, the middle sandwich-structured portion 19, the leading-edge-side sandwich-structured portion 25, and the trailing-edge-side sandwich-structured portion 27 in this embodiment, the core member may be used in any one of these portions alone so long as the required strength can be obtained or so long as the cost allows.

Note that the present invention is not limited to the above-described embodiment, but may be modified within a scope not departing from the spirit thereof.

The invention claimed is:

1. A wind turbine blade formed of a fiber-reinforced plastic skin, wherein a sandwich-structured portion of the skin uses a core member formed integrally of fiber layers that are arranged so as to intersect in plan view and that each penetrate in the thickness direction to constitute flow paths for resin and plastic foam filling spaces between the fiber layers, in such a manner that the fiber layers are impregnated with the resin.

2. The wind turbine blade according to claim 1, wherein the sandwich-structured portion is provided in a main beam disposed between the skin disposed so as to oppose each other.

3. The wind turbine blade according to claim 1, wherein the sandwich-structured portion is provided on an inner surface of the skin.

4. The wind turbine blade according to claim 1, wherein the core member is formed in the shape of a portion where it is used.

5. The wind turbine blade according to claim 1, wherein the core member includes a plurality of units and is assembled from these units into the shape of a portion where it is used.

6. The wind turbine blade according to claim 5, wherein the units are rectangular-parallelepiped-shaped and use correcting units for correcting the shape such that the units are formed in the shape of a portion where they are used.

7. A wind power generator that uses the wind turbine blade according to claim 1 to generate power.

8. A device, comprising
an apparatus including a fiber-reinforced plastic skin, wherein the plastic skin includes:
a sandwich-structure having a core member formed integrally of fiber layers that are arranged so as to intersect, such that in a plan view thereof, the fiber layers extend in a depth direction of the sandwich-structure that is normal to the plan view, wherein
the sandwich-structure is configured to penetrate in the depth direction such that flow paths for resin and plastic foam filling spaces which were present between the fiber layers as a result of the geometry of the sandwich-structure are impregnated with the resin.

9. The device of claim 8, wherein:
the fiber layers have a rectangular cross-section lying on a plane normal to the plan view that has a width that is substantially smaller than its height.

10. The device of claim 8, wherein:
the device is a wind turbine blade.

11. The device according to claim 8, wherein the sandwich-structured portion is provided in a main beam disposed between the skin disposed so as to oppose each other.

12. The device according to claim 8, wherein the sandwich-structured portion is provided on an inner surface of the skin.

13. The device according to claim 8, wherein the core member is formed in the shape of a portion where it is used.

14. The device according to claim 8, wherein the core member includes a plurality of units and is assembled from these units into the shape of a portion where it is used.

15. The device according to claim 14, wherein the units are rectangular-parallelepiped-shaped and use correcting units for correcting the shape such that the units are formed in the shape of a portion where they are used.

16. A wind power generator that uses the wind turbine blade according to claim 10 to generate power.

17. A method, comprising:
- obtaining a sandwich-structure that includes a core member formed integrally of fiber layers that are arranged so as to intersect in a plan view and so that each penetrate in the thickness direction, thereby forming a flow path; and
- flowing resin and plastic foam into the flow path such that spaces between the fiber layers are at least substantially filled by the resin and plastic foam, thereby impregnating the fiber layers with the resin.

18. The method of claim 17, further comprising:
- assembling components including the sandwich-structure including the core member into which the resin and plastic was flowed into a wind turbine blade.

19. The method of claim 17, further comprising:
- assembling components including the sandwich-structure including the core member into a fiber-reinforced plastic skin component; and
- assembling the fiber-reinforced plastic skin component into a wind turbine blade.

20. The method of claim 19, further comprising:
- providing the sandwich-structured portion on an inner surface of the skin.

* * * * *